US012768475B2

(12) United States Patent
Eguchi et al.

(10) Patent No.: US 12,768,475 B2
(45) Date of Patent: Oct. 20, 2026

(54) HIGH-STRENGTH STAINLESS SEAMLESS STEEL PIPE FOR OIL WELLS AND METHOD FOR PRODUCING THE SAME

(71) Applicant: JFE Steel Corporation, Tokyo (JP)

(72) Inventors: Kenichiro Eguchi, Tokyo (JP); Shinsuke Ide, Tokyo (JP)

(73) Assignee: JFE Steel Corporation, Tokyo (JP)

( * ) Notice: Subject to any disclaimer, the term of this patent is extended or adjusted under 35 U.S.C. 154(b) by 350 days.

(21) Appl. No.: 18/689,526

(22) PCT Filed: Aug. 10, 2022

(86) PCT No.: PCT/JP2022/030641
§ 371 (c)(1),
(2) Date: Mar. 6, 2024

(87) PCT Pub. No.: WO2023/053743
PCT Pub. Date: Apr. 6, 2023

(65) Prior Publication Data

US 2024/0410499 A1 Dec. 12, 2024

(30) Foreign Application Priority Data

Sep. 29, 2021 (JP) ................................ 2021-159858

(51) Int. Cl.

| | |
|---|---|
| ***F16L 9/02*** | (2006.01) |
| ***C21D 1/18*** | (2006.01) |
| ***C21D 6/00*** | (2006.01) |
| ***C21D 8/10*** | (2006.01) |
| ***C21D 9/08*** | (2006.01) |
| ***C22C 38/00*** | (2006.01) |
| ***C22C 38/02*** | (2006.01) |
| ***C22C 38/04*** | (2006.01) |
| ***C22C 38/06*** | (2006.01) |
| ***C22C 38/42*** | (2006.01) |
| ***C22C 38/44*** | (2006.01) |
| ***C22C 38/46*** | (2006.01) |
| ***C22C 38/48*** | (2006.01) |
| ***C22C 38/50*** | (2006.01) |
| ***C22C 38/52*** | (2006.01) |
| ***C22C 38/54*** | (2006.01) |
| ***C22C 38/60*** | (2006.01) |

(52) U.S. Cl.
CPC .................. *F16L 9/02* (2013.01); *C21D 1/18* (2013.01); *C21D 6/004* (2013.01); *C21D 6/005* (2013.01); *C21D 6/007* (2013.01); *C21D 6/008* (2013.01); *C21D 8/10* (2013.01); *C21D 9/085* (2013.01); *C22C 38/001* (2013.01); *C22C 38/002* (2013.01); *C22C 38/004* (2013.01); *C22C 38/005* (2013.01); *C22C 38/008* (2013.01); *C22C 38/02* (2013.01); *C22C 38/04* (2013.01); *C22C 38/06* (2013.01); *C22C 38/42* (2013.01); *C22C 38/44* (2013.01); *C22C 38/46* (2013.01); *C22C 38/48* (2013.01); *C22C 38/50* (2013.01); *C22C 38/52* (2013.01); *C22C 38/54* (2013.01); *C22C 38/60* (2013.01); *C21D 2211/008* (2013.01)

(58) Field of Classification Search
None
See application file for complete search history.

(56) References Cited

U.S. PATENT DOCUMENTS

| | | | | |
|---|---|---|---|---|
| 2009/0272469 | A1 | 11/2009 | Kimura et al. | |
| 2016/0215359 | A1* | 7/2016 | Eguchi ..................... | C21D 9/08 |
| 2017/0096722 | A1* | 4/2017 | Fujimura ................. | C21D 9/08 |
| 2019/0136337 | A1 | 5/2019 | Eguchi et al. | |
| 2020/0407814 | A1 | 12/2020 | Endo et al. | |
| 2021/0198764 | A1 | 7/2021 | Endo et al. | |
| 2021/0238705 | A1 | 8/2021 | Matsuo et al. | |
| 2023/0033540 | A1 | 2/2023 | Eguchi et al. | |

(Continued)

FOREIGN PATENT DOCUMENTS

| | | | |
|---|---|---|---|
| CN | 104937126 | A | 9/2015 |
| CN | 109563581 | A | 4/2019 |
| EP | 2 933 344 | A1 | 10/2015 |

(Continued)

OTHER PUBLICATIONS

Extended European Search Report issued Oct. 1, 2025, by the European Patent Office in corresponding European Patent Application No. 22875618.5-1103. (15 pages).

(Continued)

*Primary Examiner* — Jenny R Wu
(74) *Attorney, Agent, or Firm* — Buchanan Ingersoll & Rooney PC

(57) ABSTRACT

Provided are a high-strength stainless seamless steel pipe for oil wells and a method for producing the same. The steel pipe has a chemical composition containing, by mass, C: 0.002% to 0.05%, Si: 0.05% to 0.50%, Mn: 0.04% to 1.80%, P: 0.030% or less, S: 0.0020% or less, Cr: more than 14.0% and 17.0% or less, Ni: 4.0% to 8.0%, Mo: 1.5% to 3.0%, Al: 0.005% to 0.10%, V: 0.005% to 0.20%, N: 0.002% to 0.15%, Ti: 0.002% to 0.020%, and O: 0.006% or less, the Cr, Ni, Mo, Cu, C, Si, Mn, and N satisfying predetermined relational expressions. The microstructure of the steel pipe includes a martensite phase with an area fraction of 70% or more. The average Ti concentration in inclusions having a major-axis length of 2 μm or more is 10% by mass or more. The steel pipe has a yield strength of 758 MPa or more.

8 Claims, No Drawings

(56) References Cited

U.S. PATENT DOCUMENTS

2023/0128437 A1 4/2023 Eguchi et al.

FOREIGN PATENT DOCUMENTS

| | | | |
|---|---|---|---|
| EP | 2 947 167 | A1 | 11/2015 |
| EP | 3 456 852 | A1 | 3/2019 |
| EP | 3 822 381 | A1 | 5/2021 |
| JP | 2005105357 | A | 4/2005 |
| JP | 2008-081793 | A | 4/2008 |
| JP | 2012136742 | A | 7/2012 |
| JP | 2016145372 | A | 8/2016 |
| JP | 2016-188408 | A | 11/2016 |
| WO | 2004001082 | A1 | 12/2003 |
| WO | 2015178022 | A1 | 11/2015 |
| WO | 2016/079922 | A1 | 5/2016 |
| WO | 2017168874 | A1 | 10/2017 |
| WO | 2019225281 | A1 | 11/2019 |
| WO | 2020067247 | A1 | 4/2020 |
| WO | 2021131445 | A1 | 7/2021 |
| WO | 2021200571 | A1 | 10/2021 |

OTHER PUBLICATIONS

International Search Report (PCT/ISA/210) with translation and Written Opinion (PCT/ISA/237) mailed on Oct. 18, 2022, by the Japan Patent Office as the International Searching Authority for International Application No. PCT/JP2022/030641. (9 pages).

Office Action (The First Office Action) issued Apr. 27, 2026, by the State Intellectual Property Office of People's Republic of China in corresponding Chinese Patent Application No. 202280062289.2 and an English translation with Concise explanation of relevance of the Office Action. (14 pages).

* cited by examiner

HIGH-STRENGTH STAINLESS SEAMLESS STEEL PIPE FOR OIL WELLS AND METHOD FOR PRODUCING THE SAME

CROSS REFERENCE TO RELATED APPLICATIONS

This is the U.S. National Phase application of PCT/JP2022/030641 filed Aug. 10, 2022, which claims priority to Japanese Patent Application No. 2021-159858, filed Sep. 29, 2021, the disclosures of these applications being incorporated herein by reference in their entireties for all purposes.

FIELD OF THE INVENTION

The present invention relates to a high-strength stainless seamless steel pipe for oil wells which can be suitably used for, for example, oil wells and gas wells of crude oil and natural gas (hereinafter, referred to simply as "oil wells") and a method for producing the high-strength stainless seamless steel pipe for oil wells.

BACKGROUND OF THE INVENTION

In consideration of the surging price of crude oil and exhaustion of petroleum resources which is foreseeable in the near future, there has been active development of deep oil fields and oil fields and gas fields located in severe corrosive environments that contain hydrogen sulfide and the like, as it is called "sour environments", which have not been considered in the related art. Such oil fields and gas fields are commonly located at great depths and the atmospheres thereof have a high temperature. Furthermore, they are located in severe corrosive environments that contain $CO_2$, $Cl^-$, and $H_2S$. Thus, the steel pipes for oil wells which are used in the above environments are required to be composed of a material having both intended high strength and intended corrosion resistance.

In oil and gas fields located in environments containing a carbon dioxide gas ($CO_2$), a chlorine ion ($Cl^-$), and the like, 13Cr martensitic stainless steel pipes have been widely used as oil well pipes for drilling. Furthermore, there has been an expanding use of modified 13Cr martensitic stainless steels, which have a lower C content and higher contents of Ni, Mo, etc. than 13Cr martensitic stainless steel.

In response to the above demands, for example, the techniques disclosed in Patent Literatures 1 to 5 have been devised.

Patent Literature 1 discloses a stainless steel pipe for oil wells which has a steel composition containing, by mass, C: 0.05% or less, Si: 0.50% or less, Mn: 0.20% to 1.80%, P: 0.03% or less, S: 0.005% or less, Cr: 14.0% to 18.0%, Ni: 5.0% to 8.0%, Mo: 1.5% to 3.5%, Cu: 0.5% to 3.5%, Al: 0.05% or less, V: 0.20% or less, N: 0.01% to 0.15%, and O: 0.006% or less, the steel composition satisfying a predetermined expression, with the balance being Fe and incidental impurities. This stainless steel pipe for oil wells has improved corrosion resistance.

Patent Literature 2 discloses a high-strength stainless seamless steel pipe for oil wells which has a composition containing, by mass, C: 0.005% to 0.05%, Si: 0.05% to 0.50%, Mn: 0.20% to 1.80%, P: 0.030% or less, S: 0.005% or less, Cr: 12.0% to 17.0%, Ni: 4.0% to 7.0%, Mo: 0.5% to 3.0%, Al: 0.005% to 0.10%, V: 0.005% to 0.20%, Co: 0.01% to 1.0%, N: 0.005% to 0.15%, and O: 0.010% or less, the composition satisfying a predetermined expression, with the balance being Fe and incidental impurities. This high-strength stainless seamless steel pipe for oil wells has a yield strength of 655 MPa or more.

Patent Literature 3 discloses a high-strength stainless steel pipe for oil wells which has a composition containing, by mass, C: 0.05% or less, Si: 0.50% or less, Mn: 0.10% to 1.80%, P: 0.03% or less, S: 0.005% or less, Cr: 14.0% to 17.0%, Ni: 5.0% to 8.0%, Mo: 1.0% to 3.5%, Cu: 0.5% to 3.5%, Al: 0.05% or less, V: 0.20% or less, N: 0.03% to 0.15%, O: 0.006% or less, and one or two selected from Nb: 0.2% or less and Ti: 0.3% or less, with the balance being Fe and incidental impurities and a microstructure in which the content of MC-type carbonitrides included in precipitates is 3.0% or more by mass of the total amount of the precipitates. This high-strength stainless steel pipe for oil wells has a high strength and high corrosion resistance.

Patent Literature 4 discloses a high-strength stainless steel pipe for oil wells which has a composition containing Cr and Ni and a microstructure including the tempered martensite phase as a primary phase. The composition satisfies $Cr/Ni \leq 5.3$. The high-strength stainless seamless steel pipe for oil wells has a surface layer microstructure in which a phase that appears white when etched with a Vilella's etchant extends from the outer surface of the pipe to a thickness of 10 μm or more and 100 μm or less in the wall thickness direction and is dispersed such that the area fraction of the phase in the outer surface of the pipe is 50% or more.

Patent Literature 5 discloses a high-strength martensitic stainless seamless steel pipe for oil wells which has a composition containing, by mass, C: 0.01% or less, Si: 0.5% or less, Mn: 0.1 to 2.0%, P: 0.03% or less, S: 0.005% or less, Cr: 14.0% to 15.5%, Ni: 5.5% to 7.0%, Mo: 2.0% to 3.5%, Cu: 0.3% to 3.5%, V: 0.20% or less, Al: 0.05% or less, and N: 0.06% or less, with the balance being Fe and incidental impurities. This high-strength martensitic stainless seamless steel pipe for oil wells has a yield strength of 655 to 862 MPa, a yield ratio of 0.90 or more, and improved resistance to carbon dioxide gas corrosion and sulfide stress corrosion cracking.

PATENT LITERATURE

PTL 1: WO2004/001082
PTL 2: WO2017/168874
PTL 3: JP-A-2005-105357
PTL 4: WO2015/178022
PTL 5: JP-A-2012-136742

SUMMARY OF THE INVENTION

With the recent development of oil fields, gas fields, and the like under the severe corrosive environments, steel pipes for oil wells are required to have both high strength and excellent carbon dioxide gas corrosion resistance even in a severe corrosive environment that has a high temperature of 180° C. or more and contains a carbon dioxide gas ($CO_2$) and a chlorine ion ($Cl^-$). In addition, with an increase in the severeness of the development environment, steel pipes for oil wells are also required to have excellent sulfide stress cracking resistance (SSC resistance) even in a low-temperature environment, such as deep sea.

Since steel pipes for oil wells are used in severe environments as described above, they are commonly required to be seamless steel pipes having high reliability. It is known that flaws are likely to be formed in the inner and outer surfaces of the pipe while a seamless steel pipe is rolled. In order to address this issue, there has been a demand for a material having high hot workability.

However, in the techniques described in Patent Literatures 1 to 5, SSC resistance in the low-temperature environment is not at a sufficient level although the carbon dioxide gas corrosion resistance is improved.

Accordingly, an object according to aspects of the present invention is to address the issues of the techniques in the related art and to provide a high-strength stainless seamless steel pipe for oil wells which has a high strength, excellent hot workability, excellent carbon dioxide gas corrosion resistance in a considerably severe corrosive environment that contains a carbon dioxide gas ($CO_2$) and a chlorine ion ($Cl^-$) and has a high temperature of 180° C. or more, and excellent SSC resistance in the low-temperature environment and a method for producing the high-strength stainless seamless steel pipe for oil wells.

The term "high strength" used in accordance with aspects of the present invention refers to having a yield strength (YS) of 110 ksi (758 MPa) or more. The yield strength is preferably 125 ksi (862 MPa) or more. The yield strength is also preferably 150 ksi (1034 MPa) or less.

The expression "excellent in terms of hot workability" used accordance with aspects of in the present invention means that a cross section reduction ratio (%) determined by heating a round-bar test piece that is taken from a cast steel (billet) and has a shape of a round bar with a parallel part diameter of 10 mm to 1250° C. using a Greeble testing machine, performing holding for 100 seconds, then cooling the test piece to 1000° C. at 1° C./sec, subsequently holding the test piece for 10 seconds, and applying a tensile force to the test piece until it ruptures is 70% or more.

The expression "excellent in terms of carbon dioxide gas corrosion resistance" used in accordance with aspects of the present invention means that the corrosion rate measured by immersing a test piece in a test liquid: 20-mass % aqueous NaCl solution (liquid temperature: 180° C., $CO_2$ gas atmosphere having a pressure of 10 atmospheres), which is held in an autoclave, for an immersion period of 14 days is 0.125 mm/y or less and, when the test piece used for the corrosion test is inspected with a loupe with a 10-fold magnification for the occurrence of pitting corrosion on the surface of the test piece, a pitting corrosion having a diameter of 0.2 mm or more is absent.

The expression "excellent in terms of SSC resistance in the low-temperature environment" used in accordance with aspects of the present invention means that, when a test piece is immersed in an aqueous solution prepared by adding 0.5% by mass acetic acid+Na acetate to a test liquid: 10-mass % aqueous NaCl solution (liquid temperature: 4° C., $H_2S$: 0.02 bar, $CO_2$:0.98 bar) so as to adjust pH to be 4.0 for an immersion period of 720 hours and a test is subsequently conducted by applying a load stress that is 90% of the yield stress to the test piece, cracks are absent in the test piece that has been subjected to the test.

The methods used in the above tests are also described in detail in Examples below.

In order to achieve the above object, the inventors of the present invention conducted extensive studies of impacts to the SSC resistance of stainless steel pipes having various chemical compositions in the low-temperature environment and consequently found that all the SSC (sulfide stress cracking) resistance of the stainless steel pipes are cracks formed at pitting corrosions as a result of hydrogen embrittlement.

The inventors conducted further studies of the occurrence of pitting corrosion and cracking and consequently found that inclusions composed primarily of an oxide or a sulfide act as points at which pitting corrosion or cracking occurs. It was also found that the inclusions are unlikely to act as points at which pitting corrosion or cracking occurs when the Ti concentration in the inclusions is high. This is presumably because, when the Ti concentration in the inclusions is high, the chemical stability of the inclusions is enhanced and this reduces the dissolution of the inclusions.

Aspects of the present invention were made as a result of conducting further studies on the basis of the above-described findings. Specifically, a summary of aspects of the present invention is as follows.

[1] A high-strength stainless seamless steel pipe for oil wells, the steel pipe including a chemical composition containing, by mass, C: 0.002% to 0.05%,
Si: 0.05% to 0.50%,
Mn: 0.04% to 1.80%,
P: 0.030% or less,
S: 0.0020% or less,
Cr: more than 14.0% and 17.0% or less,
Ni: 4.0% to 8.0%,
Mo: 1.5% to 3.0%,
Al: 0.005% to 0.10%,
V: 0.005% to 0.20%,
N: 0.002% to 0.15%,
Ti: 0.002% to 0.020%, and
O: 0.006% or less, the chemical composition satisfying Expressions (1) and (2), with the balance being Fe and incidental impurities, wherein a microstructure of the steel pipe includes a martensite phase such that an area fraction of the martensite phase is 70% or more, and an average Ti concentration in an inclusion having a major-axis length of 2 μm or more is 10% by mass or more, wherein the steel pipe has a yield strength of 758 MPa or more, and $$Cr+0.65\times Ni+0.6\times Mo+0.55\times Cu-20\times C\geq 18.5 \quad (1)$$

$$Cr+Mo+0.30\times Si-43.3\times C-0.4\times Mn-Ni-0.3\times Cu-9\times N\leq 11.0 \quad (2)$$

wherein, in each of the above expressions, Cr, Ni, Mo, Cu, C, Si, Mn, and N represent the contents (% by mass) of the respective elements, and the content of an element that is not included is considered as zero.

[2] The high-strength stainless seamless steel pipe for oil wells described in [1], wherein the chemical composition further contains, by mass, one or two groups selected from Group A and Group B below, Group A: one or two selected from Cu: 3.5% or less and W: 3.0% or less Group B: one or two or more selected from Nb: 0.20% or less, Zr: 0.20% or less, B: 0.01% or less, REM: 0.01% or less, Ca: 0.0025% or less, Sn: 0.20% or less, Sb: 0.50% or less, Ta: 0.1% or less, Mg: 0.01% or less, and Co: 1.0% or less.

[3] A method for producing the high-strength stainless seamless steel pipe for oil wells described in [1] or [2], the method including:

heating a steel pipe material having the chemical composition to a heating temperature of 1100° C. to 1350° C. and then forming the steel pipe material into a seamless steel pipe by hot working;

subsequently performing a quenching treatment in which the seamless steel pipe is reheated to a temperature equal to or higher than an $Ac_3$ transformation temperature and equal to or lower than 1050° C. and then cooled to a cooling stop temperature of 100° C. or less in terms of a surface temperature of the steel pipe at a cooling rate equal to or higher than a cooling rate of natural cooling; and subsequently performing a tempering treatment in which the steel pipe is heated to a tempering temperature equal to or higher than 500° C. and equal to or lower than an $Ac_1$ transformation temperature.

[4] The method for producing the high-strength stainless seamless steel pipe for oil wells described in [3], wherein a set of the quenching treatment and the tempering treatment is repeated two or more times.

According to aspects of the present invention, a high-strength stainless seamless steel pipe for oil wells which is excellent in terms of hot workability, carbon dioxide gas corrosion resistance, and SSC resistance in the low-temperature environment and has a high strength, that is, a yield strength YS of 758 MPa or more, and a method for producing the high-strength stainless seamless steel pipe for oil wells can be provided.

DETAILED DESCRIPTION OF EMBODIMENTS OF THE INVENTION

Embodiments of the present invention are described in detail below. Note that the present invention is not limited by the following embodiments.

First, the chemical composition of the high-strength stainless seamless steel pipe for oil wells according to aspects of the present invention and the reasons for limitations on the chemical composition are described. Hereinafter, "% by mass" is referred to simply as "%" unless otherwise specified.

C: 0.002% to 0.05%

C is an element important for increasing the strength of a martensitic stainless steel. In accordance with aspects of the present invention, the C content needs to be 0.002% or more in order to achieve the strength intended in accordance with aspects of the present invention. However, if the C content exceeds 0.05%, strength becomes reduced conversely. Moreover, SSC resistance in the low-temperature environment also becomes degraded. Accordingly, in accordance with aspects of the present invention, the C content is limited to 0.002% to 0.05%. In consideration of carbon dioxide gas corrosion resistance, the C content is preferably 0.040% or less. The C content is more preferably 0.035% or less and is further preferably 0.030% or less. The C content is preferably 0.01% or more and is more preferably 0.02% or more.

Si: 0.05% to 0.50%

Si is an element that serves as a deoxidizing agent. The advantageous effect is produced when the Si content is 0.05% or more. However, if the Si content exceeds 0.50%, the hot workability of the intermediate product (e.g., billet), which is produced in the middle of production of the product, becomes degraded. Furthermore, carbon dioxide gas corrosion resistance becomes degraded. Accordingly, the Si content is limited to 0.05% to 0.50%. The Si content is preferably 0.10% or more and is more preferably 0.15% or more. The Si content is preferably 0.40% or less and is more preferably 0.30% or less.

Mn: 0.04% to 1.80%

Mn is an element that reduces the formation of δ-ferrite during hot working and thereby enhances hot workability. The Mn content necessary in accordance with aspects of the present invention is 0.04% or more. However, if the Mn content is excessively high, low-temperature toughness and SSC resistance in the low-temperature environment become adversely affected. Accordingly, the Mn content is limited to 0.04% to 1.80%. The Mn content is preferably 0.10% or more, is more preferably 0.20% or more, and is further preferably 0.25% or more. The Mn content is preferably 0.80% or less, is more preferably 0.60% or less, and is further preferably 0.40% or less.

P: 0.030% or Less

P is an element that degrades all of the carbon dioxide gas corrosion resistance, pitting corrosion resistance, and SSC resistance in the low-temperature environment. Although it is preferable to minimize the P content in accordance with aspects of the present invention, reducing the P content to an excessive degree increases the production costs. Accordingly, the P content is limited to 0.030% or less, which is the range that can be industrially achieved at relatively low costs without significantly degrading the above properties. The P content is preferably 0.020% or less. The lower limit for the P content is not set. However, since reducing the P content to an excessive degree increases the production costs as described above, the P content is preferably 0.005% or more.

S: 0.0020% or Less

S significantly degrades hot workability. Furthermore, S segregates at prior-austenite grain boundaries and thereby degrades SSC resistance in the low-temperature environment. Therefore, it is preferable to minimize the S content. When the S content is 0.0020% or less, the segregation of S at prior-austenite grain boundaries can be reduced and the SSC resistance intended in accordance with aspects of the present invention can be achieved. Accordingly, the S content is limited to 0.0020% or less. The S content is preferably 0.0015% or less. The lower limit for the S content is not set. However, since reducing the S content to an excessive degree increases the production costs, the S content is preferably 0.0005% or more.

Cr: More than 14.0% and 17.0% or Less

Cr is an element that forms a protection layer and thereby enhances carbon dioxide gas corrosion resistance. In order to achieve carbon dioxide gas corrosion resistance at high temperatures of 180° C. or more, the Cr content necessary in accordance with aspects of the present invention is more than 14.0%. However, if the Cr content exceeds 17.0%, martensite transformation does not occur and the likelihood of formation of retained austenite is increased. This reduces the stability of the martensite phase and consequently makes it impossible to achieve the strength intended in accordance with aspects of the present invention. In addition, the δ-ferrite phase precipitates while heating is performed at high temperatures and hot workability becomes significantly degraded. Accordingly, the Cr content is limited to more than 14.0% and 17.0% or less. The Cr content is preferably 14.2% or more, is more preferably 14.4% or more, and is further preferably 14.6% or more. The Cr content is preferably 16.0% or less, is more preferably 15.0% or less, and is further preferably 14.8% or less.

Ni: 4.0% to 8.0%

Ni is an element that increases the strength of the protection layer and enhances carbon dioxide gas corrosion resistance. Ni also reduces the precipitation of the δ-ferrite phase and enhances hot workability. Moreover, dissolved Ni increases the strength of steel. The above advantageous effects can be produced when the Ni content is 4.0% or more. However, if the Ni content exceeds 8.0%, martensite transformation does not occur and the likelihood of formation of retained austenite is increased. This reduces the stability of the martensite phase and consequently reduces strength. Accordingly, the Ni content is limited to 4.0% to 8.0%. The Ni content is preferably 5.0% or more, is more preferably 6.0% or more, and is further preferably 6.1% or more. The Ni content is preferably 7.5% or less, is more preferably 7.0% or less, and is further preferably 6.5% or less.

Mo: 1.5% to 3.0%

Mo is an element that enhances resistance to pitting corrosion caused by $Cl^-$ or low pH. The Mo content necessary in accordance with aspects of the present invention is 1.5% or more. If the Mo content is less than 1.5%, carbon dioxide gas corrosion resistance in the severe corrosive environment and SSC resistance in the low-temperature environment become degraded. If the Mo content exceeds 3.0%, the 8-ferrite is formed and hot workability, carbon dioxide gas corrosion resistance, and SSC resistance in the low-temperature environment become degraded. Accordingly, the Mo content is limited to 1.5% to 3.0%. The Mo content is preferably 1.8% or more and is more preferably 1.9% or more. The Mo content is preferably 2.5% or less and is more preferably 2.3% or less.

Al: 0.005% to 0.10%

Al is an element that serves as a deoxidizing agent. The advantageous effect can be produced when the Al content is 0.005% or more. However, if the Al content exceeds 0.10%, the amount of oxides is excessively increased and SSC resistance in the low-temperature environment becomes adversely affected. Accordingly, the Al content is limited to 0.005% to 0.10%. The Al content is preferably 0.010% or more and 0.03% or less. The Al content is more preferably 0.015% or more and 0.025% or less.

V: 0.005% to 0.20%

V is an element that increases the strength of steel by precipitation strengthening. The advantageous effect can be produced when the V content is 0.005% or more. However, if the V content exceeds 0.20%, low-temperature toughness becomes degraded. Accordingly, the V content is limited to 0.005% to 0.20%. The V content is preferably 0.03% or more and 0.08% or less. The V content is more preferably 0.04% or more and 0.07% or less.

N: 0.002% to 0.15%

N is an element that reduces the formation of 8-ferrite at low costs and enhances hot workability. The advantageous effects can be produced when the N content is 0.002% or more. However, if the N content exceeds 0.15%, coarse nitride particles are formed and SSC resistance in the low-temperature environment becomes degraded. Accordingly, the N content is limited to 0.002% to 0.15%. The N content is preferably 0.01% or more and is more preferably 0.02% or more. The N content is preferably 0.10% or less and is more preferably 0.08% or less.

Ti: 0.002% to 0.020%

Ti is present in oxide-based or sulfide-based inclusions. Ti enhances the chemical stability of the inclusions and thereby enhances SSC resistance in the low-temperature environment. The advantageous effects can be produced when the Ti content is 0.002% or more. However, if the Ti content exceeds 0.020%, TiN precipitates as an inclusion and conversely degrades SSC resistance. Accordingly, the Ti content is limited to 0.020% or less. The Ti content is preferably 0.003% or more and 0.015% or less.

O (Oxygen): 0.006% or Less

O (oxygen) is present in steel in the form of an oxide and adversely affects various properties. Therefore, it is desirable to minimize the O content. In particular, if the O content exceeds 0.006%, SSC resistance in the low-temperature environment becomes degraded significantly. Accordingly, the O content is limited to 0.006% or less. The O content is preferably 0.004% or less. Since reducing the O content to an excessive degree increases the production costs, the O content is preferably 0.0005% or more.

In accordance with aspects of the present invention, the Cr, Ni, Mo, Cu, and C contents are set to fall within the respective ranges above and satisfy Expression (1) below.

$$Cr + 0.65\times Ni + 0.6\times Mo + 0.55\times Cu - 20\times C \geq 18.5 \quad (1)$$

In Expression (1), Cr, Ni, Mo, Cu, and C represent the contents (% by mass) of the respective elements and the content of an element that is not included is considered as zero.

If the value of the left side of Expression (1) (the value of "Cr+0.65×Ni+0.6×Mo+0.55×Cu−20×C") is less than 18.5, carbon dioxide gas corrosion resistance in a high-temperature corrosive environment that has a high temperature of 180° C. or more and contains $CO_2$ and Cl-becomes degraded. Therefore, in accordance with aspects of the present invention, the Cr, Ni, Mo, Cu, and C contents are set to satisfy Expression (1). The value of the left side of Expression (1) is preferably 19.0 or more. The upper limit for the value of the left side of Expression (1) is not set. In order to prevent an increase in costs and a reduction in strength due to an excessive addition of alloys, the value of the left side of Expression (1) is preferably 22.0 or less and is more preferably 20.5 or less.

Moreover, in accordance with aspects of the present invention, the Cr, Mo, Si, C, Mn, Ni, Cu, and N contents are set to satisfy Expression (2) below.

$$Cr + Mo + 0.30\times Si - 43.3\times C - 0.4\times Mn - Ni - 0.3\times Cu - 9\times N \leq 11.0 \quad (2)$$

In Expression (2), Cr, Mo, Si, C, Mn, Ni, Cu, and N represent the contents (% by mass) of the respective elements and the content of an element that is not included is considered as zero.

If the value of the left side of Expression (2) (the value of "Cr+Mo+0.30× Si−43.3× C−0.4× Mn−Ni−0.3×Cu−9×N") is more than 11.0, the hot workability necessary and sufficient for producing the stainless seamless steel pipe cannot be achieved and the productivity of the steel pipe becomes degraded. Therefore, in accordance with aspects of the present invention, the Cr, Mo, Si, C, Mn, Ni, Cu, and N contents are set to satisfy Expression (2). The value of the left side of Expression (2) is preferably 10.5 or less. The lower limit for the value of the left side of Expression (2) is not set. The value of the left side of Expression (2) is preferably 7 or more and is more preferably 8 or more in consideration of the saturation of the advantageous effects.

In accordance with aspects of the present invention, constituents other than those described above, that is, the balance, includes iron (Fe) and incidental impurities.

The above-described constituents are the fundamental constituents. Since the high-strength stainless seamless steel pipe for oil wells according to aspects of the present invention contains the fundamental constituents, it has the intended properties. In accordance with aspects of the present invention, the high-strength stainless seamless steel pipe for oil wells may contain, in addition to the above-described fundamental constituents, the following optional elements as needed. Since the Cu, W, Nb, Zr, B, REM, Ca, Sn, Sb, Ta, Mg, and Co constituents described below are optional, the contents of the constituents may be 0%.

One or Two Selected from Cu: 3.5% or Less and W: 3.0% or Less Cu: 3.5% or Less

Cu is an element that increases the strength of the protection layer and enhances carbon dioxide gas corrosion resistance and SSC resistance in the low-temperature environment and may be included as needed. The above advantageous effects can be produced when the Cu content is 0.5% or more. However, if the Cu content exceeds 3.5%, CuS precipitates at grain boundaries and hot workability becomes degraded. Accordingly, in the case where Cu is included, the Cu content is preferably 3.5% or less. The Cu content is preferably 0.5% or more and is more preferably 0.7% or more. The Cu content is more preferably 3.0% or less, is further preferably 1.5% or less, and is still further preferably 1.3% or less.

W: 3.0% or Less

W is an element that increases strength and enhances carbon dioxide gas corrosion resistance and SSC resistance in the low-temperature environment and may be included as needed. The above advantageous effects can be produced when the W content is 0.05% or more. However, if the W content exceeds 3.0%, the advantageous effects become saturated. Accordingly, in the case where W is included, the W content is preferably 3.0% or less. The W content is preferably 0.05% or more and is more preferably 0.5% or more. The W content is more preferably 1.5% or less.

One or Two or More Selected From Nb: 0.20% or Less, Zr: 0.20% or Less, B: 0.01% or Less, REM: 0.01% or Less, Ca: 0.0025% or Less, Sn: 0.20% or Less, Sb: 0.50% or Less, Ta: 0.1% or Less, Mg: 0.01% or Less, and Co: 1.0% or Less Nb: 0.20% or Less Nb is an element that increases strength and may be included as needed. The above advantageous effect can be produced when the Nb content is 0.01% or more. However, if the Nb content exceeds 0.20%, the advantageous effect becomes saturated. Accordingly, in the case where Nb is included, the Nb content is preferably 0.20% or less. The Nb content is preferably 0.01% or more, is more preferably 0.05% or more, and is further preferably 0.07% or more. The Nb content is more preferably 0.15% or less and is further preferably 0.13% or less.

Zr: 0.20% or Less

Zr is an element that increases strength and may be included as needed. The above advantageous effect can be produced when the Zr content is 0.01% or more. However, if the Zr content exceeds 0.20%, the advantageous effect becomes saturated. Accordingly, in the case where Zr is included, the Zr content is preferably 0.20% or less. The Zr content is preferably 0.01% or more. The Zr content is more preferably 0.10% or less and 0.03% or more.

B: 0.01% or Less

B is an element that increases strength and may be included as needed. The above advantageous effect can be produced when the B content is 0.0005% or more. However, if the B content exceeds 0.01%, hot workability becomes degraded. Accordingly, in the case where B is included, the B content is preferably 0.01% or less. The B content is preferably 0.0005% or more. The B content is more preferably 0.005% or less and 0.0010% or more.

REM: 0.01% or Less

A REM (rare-earth metal) is element that improve SSC resistance in the low-temperature environment and may be included as needed. The above advantageous effect can be produced when the REM content is 0.0005% or more. However, if the REM content exceeds 0.01%, the advantageous effect becomes saturated and the advantageous effect appropriate to the REM content cannot be produced, which is disadvantageous economically. Accordingly, in the case where REM is included, the REM content is preferably 0.01% or less. The REM content is preferably 0.0005% or more. The REM content is more preferably 0.007% or less and 0.0010% or more.

Ca: 0.0025% or Less

Ca is an element that improves hot workability and may be included as needed. The above advantageous effect can be produced when the Ca content is 0.0005% or more. However, if the Ca content exceeds 0.0025%, the number density of coarse Ca-based inclusions is increased and, consequently, it becomes impossible to achieve the intended SSC resistance in the low-temperature environment. Accordingly, in the case where Ca is included, the Ca content is preferably 0.0025% or less. The Ca content is preferably 0.0005% or more. The Ca content is more preferably 0.0020% or less and 0.0010% or more.

Sn: 0.20% or Less

Sn is an element that improves SSC resistance in the low-temperature environment and may be included as needed. The above advantageous effect can be produced when the Sn content is 0.02% or more. However, if the Sn content exceeds 0.20%, the advantageous effect becomes saturated and the advantageous effect appropriate to the Sn content cannot be produced, which is disadvantageous economically. Accordingly, in the case where Sn is included, the Sn content is preferably 0.20% or less. The Sn content is preferably 0.02% or more. The Sn content is more preferably 0.15% or less and 0.05% or more.

Sb: 0.50% or Less

Sb is an element that improves SSC resistance in the low-temperature environment and may be included as needed. The above advantageous effect can be produced when the Sb content is 0.02% or more. However, if the Sb content exceeds 0.50%, the advantageous effect becomes saturated and the advantageous effect appropriate to the Sb content cannot be produced, which is disadvantageous economically. Accordingly, in the case where Sb is included, the Sb content is preferably 0.50% or less. The Sb content is preferably 0.02% or more. The Sb content is more preferably 0.15% or less and 0.05% or more.

Ta: 0.1% or Less

Ta is an element that increases strength and also improves sulfide stress cracking resistance. Ta is also an element that has the same advantageous effects as Nb. Thus, part of Nb may be replaced with Ta. The above advantageous effects can be produced when the Ta content is 0.01% or more. However, if the Ta content exceeds 0.1%, low-temperature toughness becomes degraded. Accordingly, in the case where Ta is included, the Ta content is preferably 0.1% or less. The Ta content is preferably 0.01% or more. The Ta content is more preferably 0.03% or more and 0.07% or less.

Mg: 0.01% or Less

Mg is an element that enhances SSC resistance in the low-temperature environment and may be included as needed. The above advantageous effect can be produced when the Mg content is 0.0002% or more. However, if the Mg content exceeds 0.01%, the advantageous effect becomes saturated and the advantageous effect appropriate to the Mg content cannot be produced. Accordingly, in the case where Mg is included, the Mg content is preferably 0.01% or less. The Mg content is preferably 0.0002% or more. The Mg content is more preferably 0.0020% or less and 0.0004% or more.

Co: 1.0% or Less

Co is an element that reduces the fraction of retained austenite by increasing the Ms temperature and enhances strength and SSC resistance in the low-temperature environment and may be included as needed. The above advantageous effects can be produced when the Co content is 0.01% or more. However, if the Co content exceeds 1.0%, hot workability becomes degraded. Accordingly, in the case where Co is included, the Co content is limited to 1.0% or less. The Co content is preferably 0.01% or more, is more preferably 0.05% or more, and is further preferably 0.07% or more. The Co content is preferably 0.15% or less and is more preferably 0.09% or less.

The microstructure of the high-strength stainless seamless steel pipe for oil wells according to aspects of the present invention and the reasons for limitations on the microstructure are described below.

In order to achieve the strength intended in accordance with aspects of the present invention, the microstructure of the high-strength stainless seamless steel pipe for oil wells according to aspects of the present invention includes the martensite phase (tempered martensite phase) as a primary phase. Note that the term "primary phase" used herein refers to a microstructure component having an area fraction of 70% or more.

In accordance with aspects of the present invention, the area fraction of the martensite phase is limited to 70% or more in order to achieve the strength intended in accordance with aspects of the present invention. The area fraction of the martensite phase is preferably 95% or less. The area fraction of the martensite phase is more preferably 80% or more and 90% or less.

The balance of the microstructure of the steel pipe according to aspects of the present invention, which is other than the primary phase, is the retained austenite phase, or the retained austenite phase and the ferrite phase. In order to limit the degradation of carbon dioxide gas corrosion resistance, SSC resistance in the low-temperature environment, and hot workability, the total area fraction of the microstructure components included in the balance, which is other than the primary phase, is 30% or less. The above total area fraction is more preferably 25% or less and is further preferably 20% or less.

In particular, since an excessively large amount of retained austenite phase reduces strength, it is more preferable to limit the area fraction of the retained austenite phase to be less than 30%. Since the ferrite phase degrades hot workability, it is more preferable to limit the area fraction of the ferrite phase to be 5% or less.

The above microstructure components can be measured by the following method.

First, a test piece for microstructure observation is taken from the wall-thickness center of a cross section orthogonal to the axial direction of the pipe. The test piece is etched with a Vilella's reagent (a reagent prepared by mixing picric acid, hydrochloric acid, and ethanol at proportions of 2 g picric acid, 10 ml hydrochloric acid, and 100 ml ethanol). Then, an image of the microstructure is captured with a scanning electron microscope (magnification: 1000-fold). The fraction (area %) of the ferrite phase is calculated with an image analyzer. When etching is performed with a Vilella's reagent, the ferrite phase is hardly etched and only the other phases, such as the martensite phase, can be etched. Therefore, the fraction of the ferrite phase can be calculated by performing binarization on the basis of the contrast of the captured image.

A test piece for X-ray diffraction is ground and polished such that a cross section (C-section) orthogonal to the axial direction of the pipe serves as a measuring plane. The amount of retained austenite (γ) is measured by an X-ray diffraction method. The amount of retained austenite is determined by measuring the integral intensities of the X-rays diffracted on the (220)-plane of γ and the (211)-plane of a (ferrite) and performing a conversion using the following formula. In this measurement, the volume fraction of retained austenite is considered as the area fraction thereof.

$$\gamma\ (\text{volume fraction}) = 100/(1 + (I\alpha R\gamma / I\gamma R\alpha))$$

where Iα represents the integral intensity of α, Rα represents the crystallographic theoretical calculated value of α, Iγ represents the integral intensity of γ, and Rγ represents the crystallographic theoretical calculated value of γ.

The fraction (area %) of the martensite phase (tempered martensite phase) is considered as the balance other than the ferrite phase or the retained γ phase.

Furthermore, in the microstructure of the steel pipe according to aspects of the present invention, the average Ti concentration in inclusions having a major-axis length of 2 μm or more is 10% by mass or more.

As described above, it was found that inclusions composed primarily of an oxide or a sulfide act as points at which pitting corrosion or cracking occurs. It was also found that, when the Ti concentration in such inclusions is high, the inclusions are unlikely to act as points at which pitting corrosion or cracking occurs. This is presumably because, when the Ti concentration in the inclusions is high, the chemical stability of the inclusions is enhanced and this reduces the dissolution of the inclusions.

In the case where the major-axis length of oxide-based or sulfide-based inclusions included in the microstructure of the steel pipe is less than 2 μm, the possibility of the inclusions acting as points at which pitting corrosion or cracking occurs is reduced regardless of the Ti concentration in the inclusions. Accordingly, in accordance with aspects of the present invention, inclusions having a major-axis length of 2 μm or more are targeted. If the average Ti concentration in oxide-based or sulfide-based inclusions having a major-axis length of 2 μm or more is less than 10% by mass, the inclusions are likely to act as points at which pitting corrosion occurs and, consequently, it becomes impossible to achieve SSC resistance in the low-temperature environment, which is intended in accordance with aspects of the present invention. Accordingly, the average Ti concentration is limited to 10% by mass or more and is preferably 15% by mass or more. The upper limit for the average Ti concentration is not set. If the amount of Ti added to steel is increased in order to increase the Ti concentration in the inclusions, coarse TiN particles are formed and conversely act as points at which pitting corrosion or cracking occurs. Therefore, the average Ti concentration in the inclusions is preferably 50% by mass or less and is more preferably 40% by mass or less.

The major-axis lengths of the inclusions and the average Ti concentration in the inclusions, which are described above, can be measured by the methods described in Examples below.

A method for producing the high-strength stainless seamless steel pipe for oil wells according to an embodiment of the present invention is described below.

Note that, in the following description of the production method, the term "temperature" (° C.) refers to the surface temperature of a steel pipe material or a steel pipe (seamless steel pipe subsequent to pipe production) unless otherwise specified. The surface temperature can be measured using a radiation thermometer or the like.

In accordance with aspects of the present invention, a steel pipe material having the above-described chemical composition is used as a starting material. The method for producing the steel pipe material used as a starting material is not limited. For example, it is preferable to prepare a molten steel having the above-described chemical composition using a converter or the like and form the molten steel into a steel pipe material, such as a billet, by a continuous casting process, an ingot casting-blooming process, or the like.

Subsequently, the steel pipe material is heated (heating step). The heated steel pipe material is formed into a hollow mother pipe with a piercer by a Mannesmann-plug mill process or a Mannesmann-mandrel mill process. The mother pipe is subjected to hot working to form a pipe (pipe production step). Hereby, a seamless steel pipe having the intended dimensions (predetermined shape) and the above-described chemical composition is prepared. The seamless steel pipe can also be produced by press-type hot extrusion.

In the step of heating the steel pipe material, the heating temperature is set to 1100° C. to 1350° C. If the heating temperature is less than 1100° C., hot workability becomes degraded and a number of flaws occur during pipe production. If the heating temperature is a high temperature exceeding 1350° C., crystal grains become coarsened and SSC resistance becomes degraded. Accordingly, the heating temperature in the heating step is limited to 1100° C. to 1350° C. The heating temperature is preferably 1150° C. or more and 1300° C. or less.

Subsequent to the pipe production, the seamless steel pipe is cooled to room temperature at a cooling rate equal to or higher than that of natural cooling. This makes it possible to achieve the microstructure of the steel pipe which includes the martensite phase as a primary phase.

In accordance with aspects of the present invention, after the cooling at a cooling rate equal to or higher than that of natural cooling has been performed subsequent to the pipe production, the steel pipe (seamless steel pipe subsequent to the pipe production) is subjected to a heat treatment (quenching treatment and tempering treatment). Specifically, a quenching treatment in which the steel pipe (seamless steel pipe subsequent to the pipe production) is reheated to a temperature (heating temperature) equal to or higher than the $Ac_3$ transformation temperature and equal to or lower than 1050° C., holding is then performed for a predetermined amount of time, and cooling is subsequently performed at a cooling rate equal to or higher than that of natural cooling to a temperature (cooling stop temperature) of 100° C. or less in terms of the surface temperature of the steel pipe is performed. This enables formation of the above martensite phase and an increase in strength to be achieved.

It is possible to adjust the Ti concertation in the inclusions to fall within the intended range by adding an amount of Ti which is appropriate to the concentrations of 0, S, Al, Mg, and Ca or the amounts of oxides and sulfides dissolved.

Note that the cooling rate equal to or higher than that of natural cooling is 0.01° C./s or more.

The heating temperature (reheating temperature) in the quenching treatment is limited to be equal to or higher than the $Ac_3$ transformation temperature and equal to or lower than 1050° C. in order to prevent coarsening of the microstructure and achieve the intended strength. The reheating temperature is preferably 800° C. to 1050° C. and is more preferably 900° C. or more and 960° C. or less.

In order to achieve soaking, it is preferable to hold the steel pipe at the above reheating temperature for 5 minutes or more. The above holding time is preferably 30 minutes or less.

In order to achieve the yield strength (YS) intended in accordance with aspects of the present invention, the cooling stop temperature is limited to 100° C. or less. The cooling stop temperature is preferably 50° C. or less.

The steel pipe that has been subjected to the quenching treatment is then subjected to a tempering treatment. The tempering treatment is a treatment in which heating is performed to a temperature (tempering temperature) equal to or higher than 500° C. and equal to or lower than the $Ac_1$ transformation temperature, holding is then performed for a predetermined amount of time, and natural cooling is subsequently performed. Instead of the entirety or a part of the natural cooling, another cooling method, such as water cooling, oil cooling, or mist cooling, may be performed.

If the tempering temperature exceeds the $Ac_1$ transformation temperature, the fresh martensite phase precipitates subsequent to tempering and, consequently, it becomes impossible to achieve the intended high strength. If the tempering temperature is lower than 500° C., dislocation density is increased to an excessive degree and, as a result, strength is increased to an excessive degree. This makes it difficult to achieve the intended sulfide stress cracking resistance. Accordingly, the tempering temperature is limited to be equal to or higher than 500° C. and equal to or lower than the Ac transformation temperature. In such a case, the microstructure of the steel pipe is a microstructure that includes the tempered martensite phase as a primary phase and a seamless steel pipe having the strength, carbon dioxide gas corrosion resistance, and SSC resistance in the low-temperature environment that are intended in accordance with aspects of the present invention can be produced. The tempering temperature is preferably 530° C. or more and 600° C. or less.

In order to perform soaking of the material, it is preferable to hold the steel pipe at the above tempering temperature for 10 minutes or more. The holding time is preferably 90 minutes or less.

In accordance with aspects of the present invention, a set of the above-described quenching treatment and tempering treatment may be repeated two or more times. In such a case, SSC resistance in the low-temperature environment can be enhanced.

Note that the $Ac_3$ and $Ac_1$ transformation temperatures above are measured values determined from a change in expansion coefficient which occurs when a test piece (ϕ: 3 mm×L: 10 mm) is heated and cooled at 15° C./min.

Although a seamless steel pipe is described above as an example, the present invention is not limited to this; it is also possible to produce an electric resistance welded steel pipe or a UOE steel pipe using a steel pipe material having the above-described chemical composition and use the steel pipe as a steel pipe for oil wells. In such a case, the high-strength stainless seamless steel pipe for oil wells according to aspects of the present invention can be produced by subjecting the above steel pipe for oil wells to the quenching and tempering treatments under the above-described conditions.

As described above, according to aspects of the present invention, the intermediate product (e.g., billet) formed in the middle of production of the product has excellent hot workability. Furthermore, a high-strength stainless seamless steel pipe for oil wells which is excellent in terms of carbon dioxide gas corrosion resistance and SSC resistance in the low-temperature environment and has a high strength, that is, a yield strength YS of 758 MPa or more, can be produced.

EXAMPLES

Aspects of the present invention are described on the basis of Examples below. The present invention is not limited by Examples below.

Molten steels having the chemical compositions described in Table 1 were prepared with a vacuum melting furnace and cast steels were formed. The cast steels were heated at heating temperatures described in Table 2 and then subjected to hot working. In Table 1, "-" means that the element was not intentionally added and refers to not only the case where the element was not included (0%) but also the case where the element was inevitably included.

Subsequently, a test piece material was taken from each of the steel materials prepared by hot working. The steel materials had dimensions of 1100 mm long, 160 mm width, and 15 mm thick. Each of the test piece materials was subjected to a quenching treatment in which it was heated to a corresponding one of the heating temperatures (reheating temperatures) described in Table 2 during a corresponding one of the soaking times described in Table 2 and then naturally cooled to a corresponding one of the cooling stop temperatures described in Table 2. Furthermore, a tempering treatment in which the test piece material was heated at a corresponding one of the tempering temperatures described in Table 2 during a corresponding one of the soaking times described in Table 2 and then naturally cooled was performed. Some of the test pieces (steel pipe Nos. 2 and 4) were repeatedly subjected to a set of the quenching and tempering treatments two times under the conditions described in Table 2. Although test pieces taken from the steel materials were subjected to the quenching and tempering treatments, this is considered similar to the cases where seamless steel pipes are subjected to the quenching and tempering treatments.

Each of the test piece materials that had been subjected to the quenching and tempering treatments was evaluated in terms of tensile properties, corrosion properties, SSC resistance, and hot workability by the methods described below and was subjected to the measurements of microstructure and the composition of inclusions.

[Evaluation of Tensile Properties]

A JIS (Japanese Industrial Standards) No. 14A test piece for tensile test (0:6.0 mm) was taken from the test piece material that had been subjected to the quenching and tempering treatments. A tensile test was conducted in accordance with JIS Z2241:2011 to determine tensile properties (yield strength (YS) and tensile strength (TS)). In this evaluation, a test piece having a yield strength (YS) of 758 MPa or more was evaluated as "Pass", while a test piece having a yield strength of less than 758 MPa was evaluated as "Fail".

[Evaluation of Corrosion Properties]

A test piece for corrosion test which had a thickness of 3 mm, a width of 30 mm, and a length of 40 mm was prepared, by machining, from the test piece material that had been subjected to the quenching and tempering treatments. Then, a corrosion test was conducted.

In the corrosion test, the test piece for corrosion test was immersed in a test liquid: 20-mass % aqueous NaCl solution (liquid temperature: 180° C., $CO_2$ gas atmosphere having a pressure of 10 atmospheres) held in an autoclave. An immersion period was set to 14 days. The weight of the test piece for corrosion test was measured subsequent to the test. A corrosion rate was calculated on the basis of the weight reduction which occurred during the corrosion test. In this evaluation, a test piece having a corrosion rate of 0.125 mm/y or less was evaluated as "Pass", while a test piece having a corrosion rate of more than 0.125 mm/y was evaluated as "Fail".

Furthermore, the test piece for corrosion test which had been subjected to the corrosion test was inspected with a loupe with a 10-fold magnification for the occurrence of pitting corrosion on the surface of the test piece. The expression "pitting corrosion was present" used herein means that a pitting corrosion having a diameter of 0.2 mm or more was present, while the expression "pitting corrosion was absent" used herein means that the pitting corrosion was absent. In this evaluation, a test piece in which the pitting corrosion was absent ("No" is shown in the column "Pitting corrosion" of Table 3) was evaluated as "Pass", while a test piece in which the pitting corrosion was present ("Yes" is shown in the column "Pitting corrosion" of Table 3) was evaluated as "Fail".

As described above, the case where the above corrosion rate was 0.125 mm/y or less and the above pitting corrosion was absent was evaluated as "excellent in terms of carbon dioxide gas corrosion resistance".

[Evaluation of SSC Resistance]

The SSC test is a test for evaluating the cracking sensitivity of a test piece to which a stress is applied in a corrosive environment containing $H_2S$. The SSC test (sulfide stress cracking test) was conducted in accordance with NACE TM0177 Method A.

As for the test environment, an aqueous solution prepared by adding 0.5% by mass acetic acid+Na acetate to a 10-mass % aqueous NaCl solution (liquid temperature: 4° C., $H_2S$: 0.02 bar, $CO_2$:0.98 bar) so as to adjust pH to be 4.0 was used, and the immersion period was set to 720 hours. The test was conducted by applying a load stress that was 90% of the yield stress to the test piece. In this evaluation, the case where cracks were absent in the test piece that had been subjected to the test ("No" is shown in the column "SSC" of Table 3) was evaluated as "Pass", while the case where cracks were present in the test piece that had been subjected to the test ("Yes" is shown in the column "SSC" of Table 3) was evaluated as "Fail".

As described above, the case where cracks were absent in the test piece was evaluated as "excellent in terms of SSC resistance in the low-temperature environment".

[Evaluation of Hot Workability]

In the evaluation of hot workability, a cross section reduction ratio (%) was determined by heating a round-bar test piece that was taken from the cast slab and had a shape of a round bar with a parallel part diameter of 10 mm to 1250° C. using a Greeble testing machine, performing holding for 100 seconds, then cooling the test piece to 1000° C. at 1° C./sec, subsequently holding the test piece for 10 seconds, and applying a tensile force to the test piece until it ruptured. In this evaluation, when the cross section reduction ratio was 70% or more, it was considered that excellent hot workability was achieved and an evaluation of "Pass" was given. When the cross section reduction ratio was less than 70%, an evaluation of "Fail" was given.

As described above, the case where the cross section reduction ratio was 70% or more was evaluated as "excellent in terms of hot workability".

[Measurement of Composition of Inclusions]

A test piece was taken from the test piece material that had been subjected to the quenching and tempering treatments. Subsequently, the analysis of inclusions was conducted. For the analysis of inclusions, a sample for scanning electron microscope (SEM) which had an area of 50 $mm^2$ was taken from a cross section orthogonal to the wall-thickness direction at depths of ¼ and ¾ of the wall thickness below the surface at a position randomly selected in the width direction. In each of the samples, inclusions were identified by SEM observation. The chemical composition of each of the inclusions having a major-axis length of 2 μm or more was analyzed using a characteristic X-ray analyzer attached to the SEM. The total of the Ti concentrations in the inclusions having a major-axis length of 2 μm or more was divided by the number of the inclusions having a major-axis length of 2 μm or more to calculate an average (average Ti concentration). The average is shown in the column "Average Ti concentration in inclusions (mass %)" of Table 3.

The inclusions having a major-axis length of 2 μm or more were identified by binarizing the contrast of the reflection electron image obtained by SEM, defining the peripheries of the inclusions, and measuring the major-axis lengths of the inclusions on the basis of the peripheries of the inclusions.

[Measurement of Microstructure]

A test piece for microstructure observation was prepared from the test piece material that had been subjected to the quenching and tempering treatments. Then, each of the microstructure components was measured. The plane in which the microstructure was observed was a cross section orthogonal to the rolling direction (C-section). First, the test piece for microstructure observation was etched with a Vilella's reagent (a reagent prepared by mixing picric acid, hydrochloric acid, and ethanol at proportions of 2 g picric acid, 10 ml hydrochloric acid, and 100 ml ethanol). Then, an image of the microstructure was captured with a scanning electron microscope (magnification: 1000-fold). The fraction (area %) of the ferrite phase was calculated with an image analyzer. When etching was performed with a Vilella's reagent, the ferrite phase was hardly etched and only the other phases, such as the martensite phase, were etched. Therefore, the fraction of the ferrite phase was calculated by performing binarization on the basis of the contrast of the captured image.

A test piece for X-ray diffraction was ground and polished such that a cross section (C-section) orthogonal to the rolling direction of the pipe served as a measuring plane. The amount of retained austenite (γ) was measured by an X-ray diffraction method. The amount of retained austenite was determined by measuring the integral intensities of the X-rays diffracted on the (220)-plane of γ and the (211)-plane of α (ferrite) and performing a conversion using the following formula. In this measurement, the volume fraction of retained austenite was considered as the area fraction thereof.

$$\gamma \text{ (volume fraction)} = 100/(1 + (I\alpha R\gamma / I\gamma R\alpha))$$

where Iα represents the integral intensity of α, Rα represents the crystallographic theoretical calculated value of α, Iγ represents the integral intensity of γ, and Rγ represents the crystallographic theoretical calculated value of γ.

The fraction (area %) of the martensite phase (tempered martensite phase) was considered as the balance other than the ferrite phase or the retained γ phase.

Table 3 lists the results.

TABLE 1

| Steel type No. | Chemical composition (mass %) C | Si | Mn | P | S | Cr | Ni | Mo | Al | V | N | O | Ti | Optional addition | Value of left side of Expression (1) *1 | Value of left side of Expression (2) *2 |
|---|---|---|---|---|---|---|---|---|---|---|---|---|---|---|---|---|
| A | 0.016 | 0.29 | 0.43 | 0.022 | 0.0011 | 14.9 | 5.3 | 1.8 | 0.012 | 0.035 | 0.084 | 0.0011 | 0.003 | Co: 0.13 | 19.1 | 9.9 |
| B | 0.019 | 0.28 | 0.47 | 0.021 | 0.0011 | 15.0 | 5.2 | 1.5 | 0.008 | 0.042 | 0.077 | 0.0010 | 0.011 | Co: 0.93 | 18.9 | 9.7 |
| C | 0.029 | 0.16 | 0.33 | 0.022 | 0.0012 | 14.3 | 5.9 | 1.7 | 0.010 | 0.040 | 0.072 | 0.0021 | 0.002 | Cu: 0.70, Nb: 0.06 | 19.0 | 7.9 |
| D | 0.016 | 0.29 | 0.46 | 0.025 | 0.0010 | 15.2 | 5.4 | 1.8 | 0.011 | 0.039 | 0.090 | 0.0009 | 0.008 | Cu: 0.74 | 19.9 | 9.8 |
| E | 0.013 | 0.20 | 0.36 | 0.018 | 0.0010 | 16.1 | 6.2 | 2.1 | 0.019 | 0.074 | 0.040 | 0.0054 | 0.017 | Cu: 1.20, Nb: 0.06, B: 0.002 | 21.8 | 10.6 |
| F | 0.022 | 0.19 | 0.35 | 0.022 | 0.0011 | 14.5 | 6.0 | 2.1 | 0.007 | 0.037 | 0.054 | 0.0017 | 0.002 | Nb: 0.061 | 19.2 | 9.1 |
| G | 0.018 | 0.19 | 0.36 | 0.022 | 0.0011 | 14.5 | 6.5 | 2.1 | 0.007 | 0.041 | 0.068 | 0.0019 | 0.015 | Nb: 0.06, Ca: 0.0019, REM: 0.0035 | 19.6 | 8.6 |
| H | 0.030 | 0.19 | 0.30 | 0.023 | 0.0009 | 14.7 | 6.1 | 2.0 | 0.011 | 0.044 | 0.044 | 0.0021 | 0.018 | Cu: 0.61, Nb: 0.101, Ca: 0.0023, REM: 0.0036 | 19.6 | 8.7 |
| I | 0.015 | 0.27 | 0.51 | 0.026 | 0.0010 | 15.5 | 5.6 | 2.1 | 0.014 | 0.042 | 0.0791 | 0.0011 | — | Sn: 0.13, Co: 0.65 | 20.1 | 10.5 |
| J | 0.013 | 0.17 | 0.35 | 0.024 | 0.0009 | 16.4 | 6.9 | 2.7 | 0.018 | 0.084 | 0.049 | 0.0049 | 0.087 | Cu: 1.23, Nb: 0.039 | 22.9 | 10.7 |
| K | 0.055 | 0.23 | 0.42 | 0.010 | 0.0009 | 16.9 | 6.8 | 1.5 | 0.021 | 0.048 | 0.109 | 0.0036 | 0.011 | — | 21.1 | 8.1 |
| L | 0.018 | 0.29 | 0.52 | 0.020 | 0.0009 | 14.2 | 3.5 | 1.7 | 0.009 | 0.050 | 0.072 | 0.0011 | 0.008 | — | 17.1 | 10.9 |
| M | 0.017 | 0.30 | 0.48 | 0.023 | 0.0009 | 15.3 | 5.2 | 1.6 | 0.012 | 0.043 | 0.098 | 0.0011 | 0.019 | Co: 1.16 | 19.3 | 10.0 |

TABLE 1-continued

| Steel type No. | Chemical composition (mass %) C | Si | Mn | P | S | Cr | Ni | Mo | Al | V | N | O | Ti | Optional addition | Value of left side of Expression (1) *1 | Value of left side of Expression (2) *2 |
|---|---|---|---|---|---|---|---|---|---|---|---|---|---|---|---|---|
| N | 0.004 | 0.22 | 0.65 | 0.007 | 0.0010 | 13.3 | 6.1 | 1.4 | 0.017 | 0.019 | 0.008 | 0.0029 | 0.019 | — | 18.0 | 8.2 |
| O | 0.014 | 0.12 | 0.36 | 0.021 | 0.0009 | 16.2 | 4.9 | 2.5 | 0.024 | 0.078 | 0.039 | 0.0039 | 0.012 | — | 20.6 | 12.7 |
| P | 0.061 | 0.24 | 0.48 | 0.012 | 0.0009 | 17.5 | 6.3 | 1.5 | 0.019 | 0.043 | 0.117 | 0.0035 | 0.176 | Cu: 0.75 | 21.7 | 8.7 |
| Q | 0.012 | 0.16 | 0.38 | 0.021 | 0.0011 | 15.4 | 6.3 | 2.5 | 0.018 | 0.076 | 0.041 | 0.0042 | 0.082 | Cu: 1.20, Nb: 0.034 | 21.4 | 10.2 |
| R | 0.004 | 0.19 | 0.72 | 0.008 | 0.0010 | 13.4 | 6.2 | 1.3 | 0.020 | 0.017 | 0.007 | 0.0028 | 0.071 | Cu: 1.12 | 18.7 | 7.7 |
| S | 0.018 | 0.15 | 0.41 | 0.017 | 0.0009 | 16.5 | 5.6 | 2.6 | 0.022 | 0.074 | 0.039 | 0.0047 | 0.058 | Cu: 1.2, Nb: 0.05, B: 0.002 | 22.0 | 11.9 |
| T | 0.018 | 0.28 | 0.51 | 0.023 | 0.0011 | 15.2 | 5.6 | 1.6 | 0.013 | 0.026 | 0.087 | 0.0011 | 0.007 | Ta: 0.04, Mg: 0.004, Co: 0.15 | 19.4 | 9.5 |
| U | 0.021 | 0.34 | 0.39 | 0.027 | 0.0012 | 15.5 | 5.1 | 2.0 | 0.013 | 0.023 | 0.083 | 0.0013 | 0.012 | W: 1.0, Co: 0.15 | 19.6 | 10.7 |
| V | 0.020 | 0.32 | 0.47 | 0.026 | 0.0009 | 15.0 | 5.6 | 1.8 | 0.012 | 0.029 | 0.084 | 0.0010 | 0.011 | Zr: 0.05, Co: 0.16 | 19.3 | 9.5 |
| W | 0.029 | 0.24 | 0.32 | 0.017 | 0.0008 | 14.7 | 6.3 | 2.0 | 0.036 | 0.037 | 0.044 | 0.0030 | 0.003 | Cu: 0.94, Nb: 0.082 | 19.9 | 8.4 |
| X | 0.014 | 0.27 | 0.44 | 0.021 | 0.0011 | 14.9 | 5.2 | 1.6 | 0.013 | 0.037 | 0.104 | 0.0029 | 0.003 | — | 19.0 | 9.7 |
| Y | 0.018 | 0.28 | 0.43 | 0.020 | 0.0011 | 15.0 | 5.1 | 1.7 | 0.014 | 0.037 | 0.074 | 0.0032 | 0.003 | Sb: 0.09 | 19.0 | 10.1 |
| Z | 0.021 | 0.18 | 0.35 | 0.020 | 0.0013 | 14.5 | 6.0 | 2.1 | 0.006 | 0.037 | 0.074 | 0.0018 | 0.003 | — | 19.3 | 8.9 |
| AA | 0.023 | 0.20 | 0.36 | 0.023 | 0.0013 | 14.5 | 6.0 | 2.1 | 0.008 | 0.037 | 0.044 | 0.0017 | 0.002 | — | 19.2 | 9.1 |

*1. $Cr + 0.65 \times Ni + 0.6 \times Mo + 0.55 \times Cu - 20 \times C \geq 18.5$ . . . (1)

*2. $Cr + Mo + 0.30 \times Si - 43.3 \times C - 0.4 \times Mn - Ni - 0.3 \times Cu - 9 \times N \leq 11.0$ . . . (2)

TABLE 2

| Steel pipe No. | Steel type No. | $Ac_1$ transformation temperature (° C.) | $Ac_3$ transformation temperature (° C.) | Steel pipe material heating temperature (° C.) | Heat treatment (first) Quenching Heating temperature (° C.) | Quenching Soaking time (min) | Quenching Cooling | Quenching Cooling stop temperature (° C.) | Tempering Tempering temperature (° C.) | Tempering Soaking time (min) | Tempering Cooling |
|---|---|---|---|---|---|---|---|---|---|---|---|
| 1 | A | 762 | 863 | 1275 | 890 | 20 | Natural cooling | 15 | 530 | 20 | Natural cooling |
| 2 | A | 762 | 863 | 1263 | 890 | 20 | Natural cooling | 15 | 530 | 20 | Natural cooling |
| 3 | B | 778 | 866 | 1241 | 890 | 20 | Natural cooling | 15 | 530 | 20 | Natural cooling |
| 4 | B | 778 | 866 | 1261 | 890 | 20 | Natural cooling | 15 | 530 | 20 | Natural cooling |
| 5 | C | 669 | 784 | 1272 | 890 | 20 | Natural cooling | 10 | 530 | 20 | Natural cooling |
| 6 | D | 770 | 870 | 1263 | 890 | 20 | Natural cooling | 15 | 530 | 20 | Natural cooling |
| 7 | E | 815 | 899 | 1230 | 960 | 20 | Natural cooling | 15 | 580 | 20 | Natural cooling |
| 8 | F | 719 | 824 | 1219 | 890 | 20 | Natural cooling | 10 | 530 | 20 | Natural cooling |
| 10 | G | 700 | 797 | 1243 | 890 | 20 | Natural cooling | 10 | 530 | 20 | Natural cooling |
| 11 | H | 701 | 810 | 1276 | 890 | 20 | Natural cooling | 10 | 530 | 20 | Natural cooling |
| 12 | I | 791 | 870 | 1247 | 890 | 20 | Natural cooling | 15 | 530 | 20 | Natural cooling |
| 13 | I | 791 | 870 | 1255 | 890 | 20 | Natural cooling | 20 | 530 | 20 | Natural cooling |
| 14 | J | 804 | 910 | 1233 | 960 | 20 | Natural cooling | 10 | 580 | 20 | Natural cooling |
| 15 | K | 818 | 874 | 1245 | 920 | 20 | Natural cooling | 15 | 580 | 20 | Natural cooling |
| 16 | L | 817 | 904 | 1263 | 910 | 20 | Natural cooling | 15 | 530 | 20 | Natural cooling |
| 17 | M | 819 | 888 | 1233 | 910 | 20 | Natural cooling | 15 | 530 | 20 | Natural cooling |
| 18 | N | 607 | 755 | 1272 | 810 | 20 | Natural cooling | 25 | 600 | 40 | Natural cooling |
| 19 | P | 807 | 913 | 1258 | 920 | 20 | Natural cooling | 30 | 580 | 20 | Natural cooling |
| 20 | Q | 765 | 896 | 1246 | 960 | 20 | Natural cooling | 30 | 580 | 20 | Natural cooling |
| 21 | R | 603 | 755 | 1268 | 810 | 20 | Natural cooling | 25 | 600 | 40 | Natural cooling |
| 22 | S | 799 | 906 | 1270 | 920 | 20 | Natural cooling | 30 | 580 | 20 | Natural cooling |
| 23 | T | 791 | 873 | 1269 | 890 | 20 | Natural cooling | 30 | 530 | 20 | Natural cooling |
| 24 | U | 804 | 887 | 1264 | 900 | 20 | Natural cooling | 50 | 530 | 88 | Natural cooling |
| 25 | V | 764 | 857 | 1268 | 890 | 20 | Natural cooling | 90 | 530 | 11 | Natural cooling |
| 26 | W | 642 | 795 | 1255 | 920 | 20 | Natural cooling | 20 | 530 | 20 | Natural cooling |
| 27 | X | 762 | 861 | 1278 | 890 | 20 | Natural cooling | 15 | 530 | 20 | Natural cooling |
| 28 | Y | 760 | 867 | 1265 | 890 | 20 | Natural cooling | 15 | 530 | 20 | Natural cooling |
| 29 | A | 762 | 863 | 1345 | 890 | 20 | Natural cooling | 15 | 530 | 20 | Natural cooling |
| 30 | A | 762 | 863 | 1105 | 890 | 20 | Natural cooling | 15 | 530 | 20 | Natural cooling |
| 32 | A | 762 | 863 | 1252 | 1040 | 20 | Natural cooling | 15 | 530 | 20 | Natural cooling |

TABLE 2-continued

| | | | | | | | | | | | |
|---|---|---|---|---|---|---|---|---|---|---|---|
| 33 | A | 762 | 863 | 1231 | 840 | 20 | Natural cooling | 15 | 530 | 20 | Natural cooling |
| 34 | A | 762 | 863 | 1250 | 890 | 30 | Natural cooling | 15 | 530 | 20 | Natural cooling |
| 35 | A | 762 | 863 | 1243 | 890 | 5 | Natural cooling | 15 | 530 | 20 | Natural cooling |
| 36 | A | 762 | 863 | 1277 | 890 | 20 | Natural cooling | 106 | 530 | 20 | Natural cooling |
| 39 | Z | 718 | 827 | 1219 | 890 | 20 | Natural cooling | 10 | 530 | 20 | Natural cooling |
| 40 | AA | 723 | 827 | 1219 | 890 | 20 | Natural cooling | 10 | 530 | 20 | Natural cooling |

| | | Heat treatment (second) | | | | | | |
|---|---|---|---|---|---|---|---|---|
| | | Quenching | | | | Tempering | | |
| Steel pipe No. | Steel type No. | Heating temperature (° C.) | Soaking time (min) | Cooling | Cooling stop temperature (° C.) | Tempering temperature (° C.) | Soaking time (min) | Cooling |
| 1 | A | | | | | | | |
| 2 | A | 890 | 20 | Natural cooling | 30 | 530 | 20 | Natural cooling |
| 3 | B | | | | | | | |
| 4 | B | 890 | 20 | Natural cooling | 30 | 530 | 20 | Natural cooling |
| 5 | C | | | | | | | |
| 6 | D | | | | | | | |
| 7 | E | | | | | | | |
| 8 | F | | | | | | | |
| 10 | G | | | | | | | |
| 11 | H | | | | | | | |
| 12 | I | | | | | | | |
| 13 | I | | | | | | | |
| 14 | J | | | | | | | |
| 15 | K | | | | | | | |
| 16 | L | | | | | | | |
| 17 | M | | | | | | | |
| 18 | N | | | | | | | |
| 19 | P | | | | | | | |
| 20 | Q | | | | | | | |
| 21 | R | | | | | | | |
| 22 | S | | | | | | | |
| 23 | T | | | | | | | |
| 24 | U | | | | | | | |
| 25 | V | | | | | | | |
| 26 | W | | | | | | | |
| 27 | X | | | | | | | |
| 28 | Y | | | | | | | |
| 29 | A | | | | | | | |
| 30 | A | | | | | | | |
| 32 | A | | | | | | | |
| 33 | A | | | | | | | |
| 34 | A | | | | | | | |
| 35 | A | | | | | | | |
| 36 | A | | | | | | | |
| 39 | Z | | | | | | | |
| 40 | AA | | | | | | | |

TABLE 3

| | | Steel pipe microstructure | | | | Hot workability | Tensile properties | | Corrosion properties | | | |
|---|---|---|---|---|---|---|---|---|---|---|---|---|
| Steel pipe No. | Steel type No. | Martensite (area %) | Retained austenite (area %) | Ferrite (area %) | Average Ti concentration in inclusions (mass %) | Cross section reduction ratio (%) | Yield strength YS (MPa) | Tensile strength TS (MPa) | Corrosion rate (mm/y) | Pitting corrosion | SSC | Remark |
| 1 | A | 98 | 1 | 1 | 17.3 | 71 | 965 | 1200 | 0.060 | No | No | Invention example |
| 2 | A | 100 | 0 | 0 | 17.3 | 71 | 977 | 1215 | 0.062 | No | No | Invention example |
| 3 | B | 99 | 0 | 1 | 33.2 | 78 | 990 | 1207 | 0.073 | No | No | Invention example |
| 4 | B | 100 | 0 | 0 | 34.3 | 78 | 984 | 1200 | 0.074 | No | No | Invention example |
| 5 | C | 99 | 1 | 0 | 12.2 | 80 | 929 | 1161 | 0.076 | No | No | Invention example |
| 6 | D | 92 | 8 | 0 | 30.0 | 71 | 972 | 1171 | 0.059 | No | No | Invention example |
| 7 | E | 82 | 14 | 4 | 45.4 | 84 | 777 | 925 | 0.020 | No | No | Invention example |
| 8 | F | 100 | 0 | 0 | 10.7 | 86 | 935 | 1169 | 0.064 | No | No | Invention example |
| 10 | G | 98 | 1 | 1 | 45.2 | 71 | 887 | 1108 | 0.067 | No | No | Invention example |
| 11 | H | 100 | 0 | 0 | 47.6 | 87 | 877 | 1083 | 0.051 | No | No | Invention example |
| 12 | I | 91 | 7 | 2 | 1.7 | 71 | 967 | 1176 | 0.056 | No | Yes | Comparative example |

TABLE 3-continued

| Steel pipe No. | Steel type No. | Steel pipe microstructure: Martensite (area %) | Steel pipe microstructure: Retained austenite (area %) | Steel pipe microstructure: Ferrite (area %) | Average Ti concentration in inclusions (mass %) | Hot workability: Cross section reduction ratio (%) | Tensile properties: Yield strength YS (MPa) | Tensile properties: Tensile strength TS (MPa) | Corrosion properties: Corrosion rate (mm/y) | Corrosion properties: Pitting corrosion | SSC | Remark |
|---|---|---|---|---|---|---|---|---|---|---|---|---|
| 13 | I | 39 | 7 | 4 | 1.6 | 71 | 1014 | 1234 | 0.055 | No | Yes | Comparative example |
| 14 | J | 77 | 18 | 5 | 69.9 | 82 | 819 | 986 | 0.013 | No | Yes | Comparative example |
| 15 | K | 65 | 34 | 1 | 35.8 | 87 | 642 | 879 | 0.017 | No | No | Comparative example |
| 16 | L | 85 | 0 | 15 | 31.6 | 55 | 649 | 832 | 0.185 | Yes | No | Comparative example |
| 17 | M | 88 | 6 | 6 | 41.8 | 61 | 982 | 1197 | 0.053 | No | No | Comparative example |
| 18 | N | 100 | 0 | 0 | 48.9 | 80 | 769 | 905 | 0.185 | Yes | Yes | Comparative example |
| 19 | P | 67 | 33 | 0 | 83.0 | 91 | 650 | 893 | 0.024 | No | Yes | Comparative example |
| 20 | Q | 88 | 10 | 2 | 69.0 | 89 | 734 | 1019 | 0.026 | No | Yes | Comparative example |
| 21 | R | 100 | 0 | 0 | 67.5 | 85 | 708 | 905 | 0.137 | No | Yes | Comparative example |
| 22 | S | 73 | 10 | 17 | 61.9 | 69 | 758 | 913 | 0.024 | No | Yes | lComparative example |
| 23 | T | 91 | 7 | 2 | 30.9 | 76 | 972 | 1210 | 0.057 | No | No | Invention example |
| 24 | U | 98 | 1 | 1 | 41.6 | 71 | 947 | 1064 | 0.055 | No | No | Invention example |
| 25 | V | 98 | 0 | 2 | 37.6 | 70 | 940 | 1080 | 0.059 | No | No | Invention example |
| 26 | W | 88 | 12 | 0 | 16.8 | 81 | 1078 | 1215 | 0.060 | No | No | Invention example |
| 27 | X | 99 | 0 | 1 | 18.6 | 74 | 975 | 1212 | 0.061 | No | No | Invention example |
| 28 | Y | 100 | 0 | 0 | 19.1 | 70 | 970 | 1206 | 0.069 | No | No | Invention example |
| 29 | A | 97 | 2 | 1 | 17.7 | 71 | 960 | 1194 | 0.065 | No | No | Invention example |
| 30 | A | 98 | 0 | 2 | 16.8 | 71 | 962 | 1197 | 0.069 | No | No | Invention example |
| 32 | A | 98 | 0 | 2 | 18.2 | 71 | 967 | 1203 | 0.051 | No | No | Invention example |
| 33 | A | 98 | 0 | 2 | 16.8 | 71 | 662 | 997 | 0.054 | No | No | Comparative example |
| 34 | A | 99 | 1 | 0 | 17.1 | 71 | 964 | 1199 | 0.051 | No | No | Invention example |
| 35 | A | 99 | 1 | 0 | 16.4 | 71 | 958 | 1192 | 0.070 | No | No | Invention example |
| 36 | A | 99 | 0 | 1 | 16.9 | 71 | 675 | 913 | 0.065 | No | No | Comparative example |
| 39 | Z | 100 | 0 | 0 | 11.3 | 86 | 937 | 1168 | 0.060 | No | No | Invention example |
| 40 | AA | 100 | 0 | 0 | 10.7 | 88 | 939 | 1165 | 0.073 | No | No | Invention example |

All of Invention Examples had a yield strength YS of 758 MPa or more and were excellent in terms of hot workability, corrosion resistance in a corrosive environment having a high temperature of 180° C. or more and including $CO_2$ and $Cl^-$ (carbon dioxide gas corrosion resistance), and SSC resistance in the low-temperature environment.

In contrast, in Comparative Examples, which were outside of the range of the present invention, the intended value was not achieved in terms of at least one of the yield strength (YS), hot workability, carbon dioxide gas corrosion resistance, and SSC resistance in the low-temperature environment.

The invention claimed is:

1. A high-strength stainless seamless steel pipe for oil wells, the steel pipe comprising a chemical composition containing, by mass, C: 0.002% to 0.05%, Si: 0.05% to 0.50%, Mn: 0.04% to 1.80%, P: 0.030% or less, S: 0.0020% or less, Cr: more than 14.0% and 17.0% or less, Ni: 4.0% to 8.0%, Mo: 1.5% to 3.0%, Al: 0.005% to 0.10%, V: 0.005% to 0.20%, N: 0.002% to 0.15%, Ti: 0.002% to 0.020%, and O: 0.006% or less, the chemical composition satisfying Expressions (1) and (2), with the balance being Fe and incidental impurities, wherein a microstructure of the steel pipe includes a martensite phase such that an area fraction of the martensite phase is 70% or more, and an average Ti concentration in an inclusion having a major-axis length of 2 μm or more is 10% by mass or more, wherein the steel pipe has a yield strength of 758 MPa or more, and $$Cr + 0.65\times Ni + 0.6\times Mo + 0.55\times Cu - 20\times C \geq 18.5 \quad (1)$$

$$Cr + Mo + 0.30\times Si - 43.3\times C - 0.4\times Mn - Ni - 0.3\times Cu - 9\times N \leq 11.0 \quad (2)$$

wherein, in each of the above expressions, Cr, Ni, Mo, Cu, C, Si, Mn, and N represent the contents (% by mass) of the respective elements, and the content of an element that is not included is considered as zero.

2. The high-strength stainless seamless steel pipe for oil wells according to claim 1, wherein the chemical composition further contains, by mass, one or two groups selected from Group A and Group B below, Group A: one or two selected from Cu: 3.5% or less and W: 3.0% or less Group B: one or two or more selected from Nb: 0.20% or less, Zr: 0.20% or less, B: 0.01% or less, REM: 0.01% or less, Ca: 0.0025% or less, Sn: 0.20% or less, Sb: 0.50% or less, Ta: 0.1% or less, Mg: 0.01% or less, and Co: 1.0% or less.

3. The high-strength stainless seamless steel pipe for oil wells according to claim 1, wherein the average Ti concentration in an inclusion having a major-axis length of 2 μm or more is 10% by mass or more and 50% by mass or less.

4. The high-strength stainless seamless steel pipe for oil wells according to claim 1, the chemical composition satisfying Expression (2):

$$8 \leq Cr + Mo + 0.30 \times Si - 43.3 \times C - 0.4 \times Mn - Ni - 0.3 \times Cu - 9 \times N \leq 11.0. \quad (2)$$

5. A method for producing the high-strength stainless seamless steel pipe for oil wells according to claim 1, the method comprising:

heating a steel pipe material having the chemical composition to a heating temperature of 1100° C. to 1350° C. and then forming the steel pipe material into a seamless steel pipe by hot working;

subsequently performing a quenching treatment in which the seamless steel pipe is reheated to a temperature equal to or higher than an $Ac_3$ transformation temperature and equal to or lower than 1050° C. and then cooled to a cooling stop temperature of 100° C. or less in terms of a surface temperature of the steel pipe at a cooling rate equal to or higher than a cooling rate of natural cooling; and subsequently performing a tempering treatment in which the steel pipe is heated to a tempering temperature equal to or higher than 500° C. and equal to or lower than an $Ac_1$ transformation temperature.

6. The method for producing the high-strength stainless seamless steel pipe for oil wells according to claim 5, wherein a set of the quenching treatment and the tempering treatment is repeated two or more times.

7. A method for producing the high-strength stainless seamless steel pipe for oil wells according to claim 2, the method comprising:

heating a steel pipe material having the chemical composition to a heating temperature of 1100° C. to 1350° C. and then forming the steel pipe material into a seamless steel pipe by hot working;

subsequently performing a quenching treatment in which the seamless steel pipe is reheated to a temperature equal to or higher than an Acs transformation temperature and equal to or lower than 1050° C. and then cooled to a cooling stop temperature of 100° C. or less in terms of a surface temperature of the steel pipe at a cooling rate equal to or higher than a cooling rate of natural cooling; and subsequently performing a tempering treatment in which the steel pipe is heated to a tempering temperature equal to or higher than 500° C. and equal to or lower than an $Ac_1$ transformation temperature.

8. The method for producing the high-strength stainless seamless steel pipe for oil wells according to claim 7, wherein a set of the quenching treatment and the tempering treatment is repeated two or more times.

* * * * *